United States Patent
Morgan, III et al.

(10) Patent No.: US 8,766,998 B1
(45) Date of Patent: Jul. 1, 2014

(54) SAMPLING OF NON-PLANAR DISPLAY SURFACES

(75) Inventors: David L. Morgan, III, Leawood, KS (US); Ignacio Sanz-Pastor, San Francisco, CA (US)

(73) Assignee: Aechelon Technology, Inc., San Francisco, CA (US)

( * ) Notice: Subject to any disclaimer, the term of this patent is extended or adjusted under 35 U.S.C. 154(b) by 711 days.

(21) Appl. No.: 12/545,935

(22) Filed: Aug. 24, 2009

Related U.S. Application Data

(60) Provisional application No. 61/091,309, filed on Aug. 22, 2008.

(51) Int. Cl.
*G06T 15/00* (2011.01)
*G09G 5/00* (2006.01)

(52) U.S. Cl.
USPC .......................................... 345/587; 345/419

(58) Field of Classification Search
USPC ................................................ 345/419, 587
See application file for complete search history.

(56) References Cited

U.S. PATENT DOCUMENTS

| | | | |
|---|---|---|---|
| 5,548,709 A * | 8/1996 | Hannah et al. | 345/552 |
| 5,917,497 A * | 6/1999 | Saunders | 345/582 |
| 6,249,289 B1 * | 6/2001 | Arnaud et al. | 345/648 |
| 6,545,686 B1 * | 4/2003 | Fadden | 345/582 |
| 6,819,333 B1 | 11/2004 | Sadowski | |
| 2002/0141623 A1 * | 10/2002 | Zavaljevski et al. | 382/128 |
| 2005/0116962 A1 * | 6/2005 | Stamm et al. | 345/613 |

* cited by examiner

*Primary Examiner* — Ke Xiao
*Assistant Examiner* — Robert Craddock
(74) *Attorney, Agent, or Firm* — Fenwick & West LLP

(57) ABSTRACT

Sampling in the process of trans-raster distortion correction is described. The distortion parameterization is analyzed to determine the maximum inflation and deflation (magnification and minification) over the image. The maximum inflation is then used to determine the optimal resolution (dimensions in pixels) of the linear-projected image such that it is not undersampled by the output image. The maximum deflation, coupled with the optimal resolution determined in the inflation step, is then used to configure the filter used in the resampling process such that aliasing due to undersampling is minimized, while simultaneously controlling the computational burden of the filter.

8 Claims, 4 Drawing Sheets

INFLATION

DEFLATION

SAMPLING OF NON-PLANAR DISPLAY SURFACES

CROSS REFERENCE TO RELATED APPLICATIONS

This application claims the benefit of U.S. Provisional Application 61/091,309, filed on Aug. 22, 2008, which is incorporated by reference in its entirety.

BACKGROUND

1. Field of the Invention

The Present invention relates to the field of computer graphics, and in particular to Nonlinear Image Mapping (NLIM).

2. Description of Related Art

Since the earliest days of 3D computer graphics, generated images have been displayed on non-planar screens. Shapes such as spherical domes, toroidal sections, polyhedrons, and other types of surfaces have been used as screens. A variety of projector technologies have been used over the years to illuminate these screens, ranging from raster and calligraphic CRTs to light valves, LCDs, LCOS, DLP, and even scanning laser projectors. With the exception of laser projectors, all of these display devices direct their light through one or more lenses.

Unlike a pinhole camera, which projects light without any defocusing or distortion, lenses are configured for a specific optical geometry, and any deviation from that geometry can introduce geometric distortion. Lenses themselves may introduce photometric distortion, as is the case with a fisheye lens. In the past, custom optics such as light valve-driven domes have been crafted to enable images to be projected onto curved display surfaces without distortion. Creating such optics is very costly, as they are limited to a single geometry that can conflict with the purpose of the display e.g., locating the lens at the center of the dome.

Even with such custom optics, the raster pattern of the projection device may need to be adjusted in order for a raster image to be properly displayed. In a three-tube CRT projector, for example, the electron beam can be made to trace curves instead of straight lines using such mechanisms as the "pincushion" adjustment. By adjusting the sampling pattern inside the projector such that the raster grid is perceived to be regular (non-distorted), a three-dimensional scene may be rendered using conventional linear perspective projection without distortion artifacts.

Today, most projector optics are designed to project onto flat screens, with at most "keystone" distortion, which can be corrected with a simple linear transformation applied to the input signal. Most modern projection technologies, e.g., LCD, DLP, and LCoS, also utilize digital raster array devices to modulate light, so no curve tracing is possible. Finally, many modern immersive displays use multiple projectors to display a single scene, with overlap zones where the images projected by adjacent projectors are blended together to create a single, seamless image. In these multi-display configurations, all the projected images must be very precisely aligned in order to prevent the appearance of discontinuities.

When the projector optics and scan pattern are fixed, the image signal provided to the projectors must compensate for photometric and geometric distortion inherent in the display geometry, as is common with keystone adjustment. The process of producing an image using a non-planar projection is known as Nonlinear Image Mapping (NLIM). It is theoretically possible to use a 3D-2D projection other than simple linear perspective projection in order to compensate for display distortion, but in practice, scenes are generally modeled using polygons and rasterized using linear edge equations. Because a single polygon can take up a very large area on screen (if the eyepoint draws close to the polygon, for example), no amount of per-vertex geometric distortion can bend the edges of the triangle.

In the absence of parametric curve rasterization, the most practical method of distortion correction is to render the 3D scene using linear perspective projection and deforming the resulting raster image to produce a second, distorted raster image that is then displayed. This deformation may be performed in the projector (as with keystone correction); in a device placed in-line between the video source and the projector, which can be an additional video processing board in a larger system as implemented on the image generation systems manufactured in the 1980s by General Electric and Evans & Sutherland; a standalone video capture and processing system such as the one disclosed by Van Belle et al; or as a postprocess in the 3D renderer itself, which is the method of choice of most current implementations outside of the projector. The latter method was first disclosed by Arnaud, Jones, and Castellar, see U.S. Pat. No. 6,249,289, and further refinements of it were presented by Johnson to extend it to programmable shading primitives and by Bhaskner to extend it to high order surface rendering from its original piecewise linear implementation.

Regardless of where the deformation occurs, the process necessarily involves resampling the input image. Each pixel of the output image may cover zero or more input pixels, and due to the potentially irregular nature of the distortion parameters, the coverage footprint (the projection of pixels areas of the second image onto the first image) may vary considerably across the image. Some areas of the first image may be undersampled (less than one input pixel per output pixel) while others are oversampled (more than one input pixel per output pixel). Undersampling, which causes input pixels to be magnified, will exaggerate aliasing that is inherent in the 3D rasterization process. Oversampling, which causes input pixels to be minified, will introduce its own aliasing artifacts. Aliasing is a well-known phenomenon where objects will appear to scintillate, sparkle, or crawl as they move through subpixel distances across the raster grid.

SUMMARY

The present invention enables a system and method for improving sampling in the process of trans-raster distortion correction. The distortion parameterization is analyzed to determine the maximum inflation and deflation (magnification and minification) over the image. The maximum inflation is then used to determine the optimal resolution (e.g., dimensions in pixels) of the linear-projected image such that it is not undersampled by the output image. The maximum deflation, coupled with the optimal resolution determined in the inflation step, is then used to configure the filter used in the resampling process such that aliasing due to undersampling is minimized, while simultaneously controlling the computational burden of the filter.

The present invention optimizes image quality in trans-raster Nonlinear Image Mapping (NLIM) systems. In one embodiment, the NLIM system is applied to projection on non-planar surfaces, but those skilled in the art will recognize that the present invention applies equally well to other trans-raster NLIM applications. Image quality is optimized by analyzing the warp transformation to quantify the amount of distortion (inflation and deflation) applied to a linearly projected image to produce the warped image. The maximum inflation in each axis is used to calculate the dimensions of the linear-projected raster grid, and the maximum deflation, coupled with the ratio of input to output resolution, is used to configure the filter used in the trans-raster resampling process. In addition to improving the image quality, the present invention controls computational complexity in the 3D rendering and resampling steps by tailoring their parameters to the specific NLIM parameters, as opposed to a brute-force approach of rendering at a large multiple of the display resolution and implementing a resampling filter with many taps.

DETAILED DESCRIPTION OF THE PREFERRED EMBODIMENTS

Figure 1:
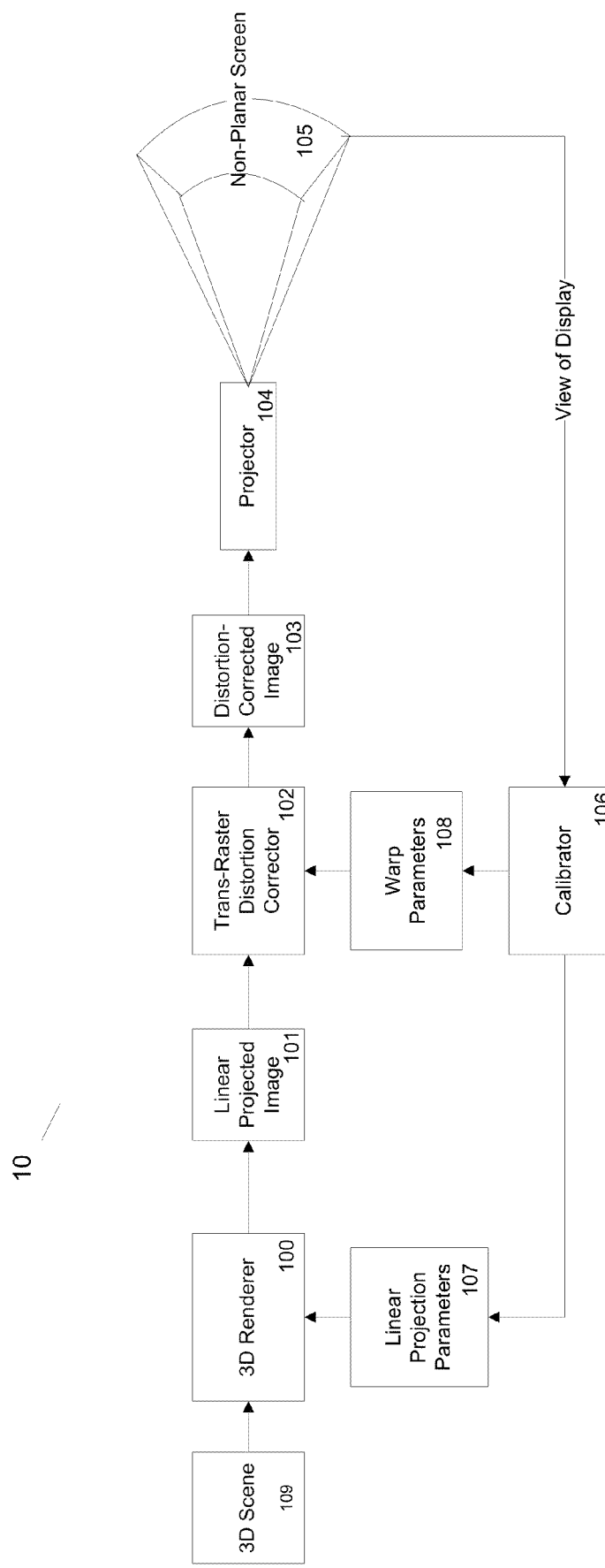
FIG. 1 illustrates a system for trans-raster distortion correction in accordance with an embodiment of the present invention.

FIG. 1 illustrates a system 10 for generalized trans-raster NLIM in accordance with an embodiment of the present invention. A three-dimensional (3D) renderer 100 linearly projects and rasterizes a 3D scene 109 into a linear projected image 101. Linear projection parameters 107, in one embodiment including a 4×4 view matrix and a 4×4 projection matrix, govern the orientation and field of view of the virtual camera governing the linear projection. Linear projected image 101, which is a two-dimensional raster image, is then processed by trans-raster distortion corrector 102, which resamples image 101 according to warp parameters 108, to produce distortion-corrected image 103, which is also a 2D raster image, typically having dimensions equal to projector 104's native resolution. Warp parameters 108 establish a mapping from points in linear raster space to points in distorted raster space. Warp parameters 108 may be embodied as a distortion mesh, a look-up table, a set of control points for a surface such as a Bézier patch, or any other mathematically defined surface. Other types of parameterization will be apparent to those skilled in the art.

Distortion-corrected image 103 is then transmitted to projector 104, which converts the input signal to a raster grid of modulated light, which is then projected onto screen 105. Calibrator 106 calculates linear projection parameters 107 and warp parameters 108 by analyzing images—typically test patterns—displayed on screen 105 by projector 104. In some embodiments, calibrator 106 is a human being, who combines mathematical calculations of display geometry with manual adjustment of parameters 107 and 108 to bring the displayed image into proper alignment. In other embodiments, calibrator 106 is an auto-calibration system, which utilizes a camera to rapidly and automatically align the image.

Specific implementations of the NLIM system depicted in FIG. 1 may incorporate trans-raster distortion corrector 102 into projector 104, into a standalone device connected in-line between 3D renderer 100 and projector 104, or as a postprocess within 3D renderer 100. The latter organization is appropriate in one embodiment because linear projected image 101 may be of arbitrary dimensions (not constrained to video format limitations) and the possibility of signal degradation between 3D renderer 100 and distortion corrector 102 is eliminated.

Figure 4:
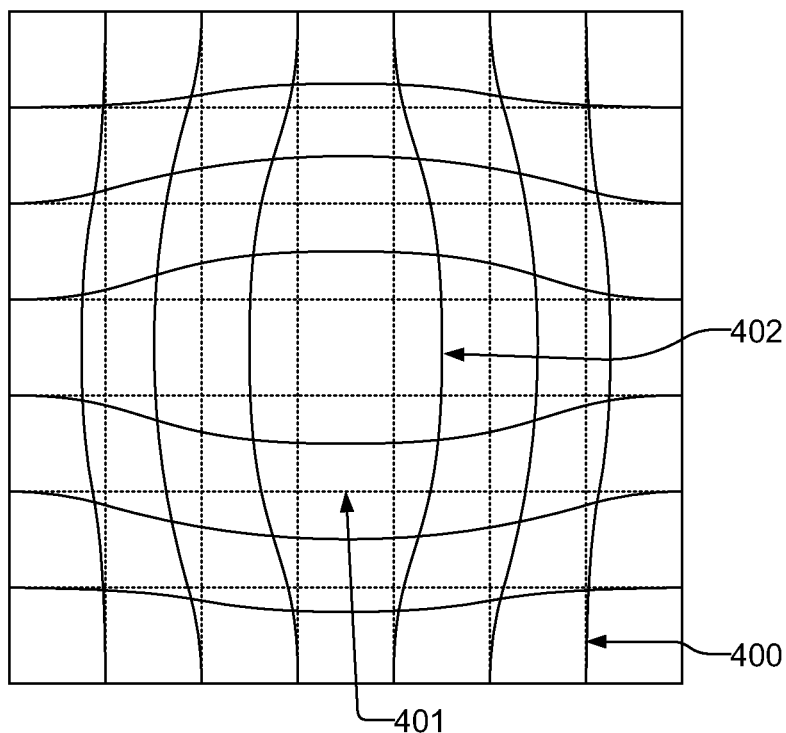
FIG. 4 Illustrates resampling in the case of inflation.

FIG. 4 is an example of distortion illustrating inflation. The depicted distortion parameterization maps from the raster grid 400 of linear projected image 101 to the raster grid 401 of distortion-corrected image 103. Note that center pixel 402 of image 101 covers multiple pixels of image 103. This condition is known as magnification, because the pixel area is perceived to be magnified. Magnification increases perception of pixilation or blurring of the source image, and exacerbates any artifacts resulting from the synthesis of image 101, such as typical raster sample aliasing.

Figure 5:
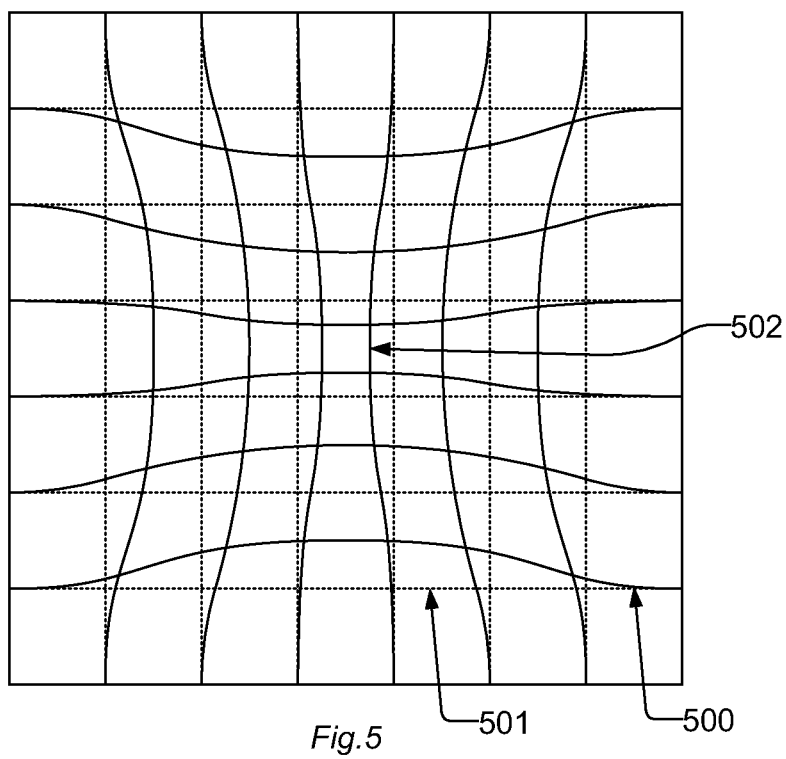
FIG. 5 Illustrates resampling in the case of deflation.

FIG. 5 is an example of distortion illustrating deflation. The depicted distortion parameterization maps from the raster grid 500 of linear projected image 101 to the raster grid 501 of distortion-corrected image 103. Note that center pixel 502 of image 101 covers less than one pixel of image 103. This condition is known as minification, the opposite of magnification. Minification potentially introduces new resampling artifacts, because the minification filter must correctly blend together multiple samples, weighted according to the proportion of the pixel footprint each sample represents. This can be a computationally intensive process.

Figure 2:
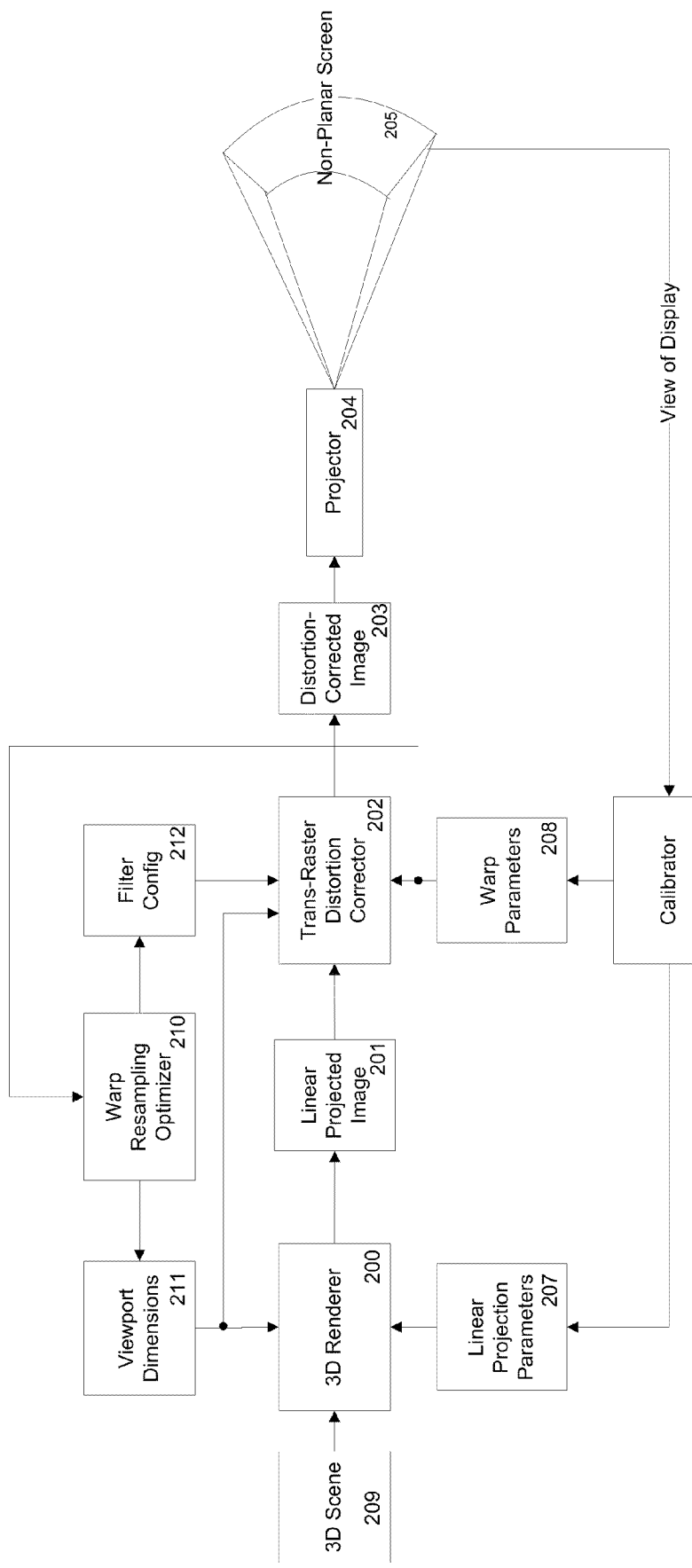
FIG. 2 illustrates a system for trans-raster distortion correction with warp resampling optimizer in accordance with an embodiment of the present invention.

FIG. 2 illustrates an embodiment of the system of FIG. 1, with the addition of warp resampling optimizer 210. Warp resampling optimizer 210 receives warp parameters 208, and in turn supplies 3D renderer 200 and trans-raster distortion corrector 202 with viewport dimensions 211 and supplies trans-raster distortion corrector 202 with filter configuration 212.

Viewport dimensions 211 specify the active area of linear projected image 201. This may be the dimensions of the entire 2D array of pixels comprising image 201, or a proper subset of the image. The latter case may be necessary if there is a granularity associated with the means by which image 201 is conveyed between render 200 and corrector 202. For example, image 201 may be required to be a power of 2 in size, or a video signal may be limited to multiples of 16 pixels. In these cases, it may be desirable to use a portion of image 201 and leave a border area unused.

Filter configuration 212 can take many forms. In one embodiment, filter configuration 212 specifies how many MIP levels to compute. Those skilled in the art will recognize that a MIP (Multum Im Parvo, meaning many in a small place) map is a multiresolution image designed for efficient filtering across a wide spectrum of minification levels. In one embodiment, filter configuration 212 also includes a maximum degree of anisotropy, which reflects the relative degree of minification between the X and Y-axes of the output image. Filter configuration 212 is not limited, however, to MIPMAP filtering. It can be a convolution kernel, or any other type of filter description known to those skilled in the art.

Viewport dimensions 211 and filter configuration 212 only change whenever warp parameters 208 are updated, whereas images 201 and 203 are updated at real-time rates, in one embodiment 60 Hz. Warp parameters 208 are regenerated whenever calibrator 206 performs a calibration, e.g., once per day. Because of these relative rates—frames (images) are rendered millions of times more frequently than calibration is performed—it is practical for warp resampling optimizer 210 to perform considerable analysis on warp parameters 206 in order to fine-tune viewport dimensions 211 and filter config 212, both of which significantly impact the amount of computation performed for every frame.

Figure 3:
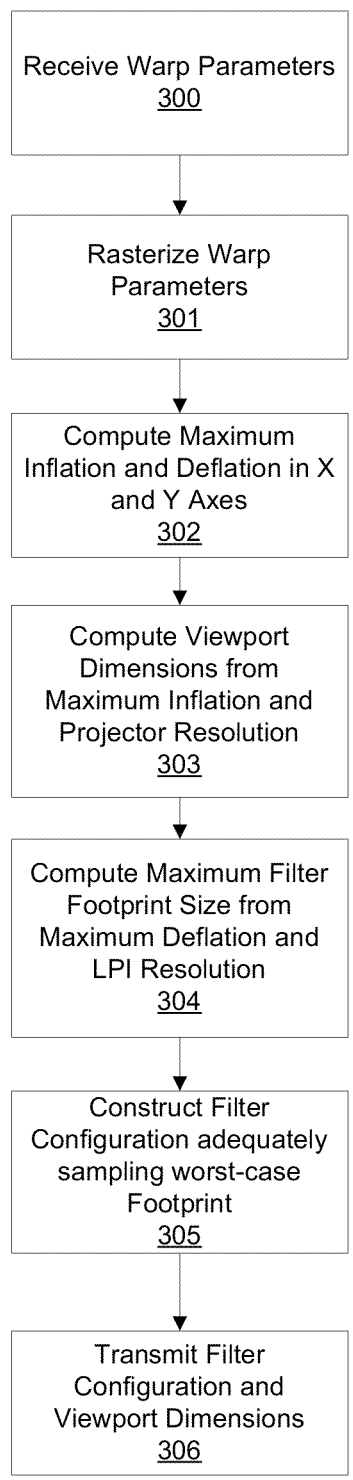
FIG. 3 shows a method for optimizing rendering resolution and warp filter configuration in accordance with an embodiment of the present invention.

FIG. 3 is a flowchart illustrating a method by which warp resampling optimizer 210 determines viewport dimensions 211 and filter configuration 212 in accordance with an embodiment of the present invention. Optimizer 210 receives 300 the warp parameters 208 from calibrator 206. Parameters may be received through shared memory, over a network, or through any other suitable means of communication. As noted, warp parameters may include a distortion mesh, control points, look-up table, or other parameterization.

Optimizer 210 then rasterizes 301 the warp parameters to determine the linear projected image x,y coordinate corresponding to the center of each pixel in the distortion corrected image. Some pixels of the distortion corrected image may not correspond to any pixel in the linear projected image. These pixels, which are typically filled with black, are marked such that they are ignored by step 302. According to one embodiment, the x,y coordinates of these pixels will be outside the valid range (negative or greater than the Linear Projected Image extents), which will cause them to be ignored in step 302.

Optimizer 210 then computes 302 the maximum inflation and deflation in X and Y-axes. Maximum inflation and deflation are determined in a manner consistent with the filtering mechanism of trans-raster distortion corrector 202. For example, if corrector 202 is using OpenGL 1.2.1-compliant texture filtering, then equation 3.15 of the OpenGL 1.2.1 specification should be used to compute the maximum inflation and deflation. Generally speaking the amount of scaling in the X axis is equal to:

$$\sigma_x = \text{Sqrt}((du/dx)^2 (dv/dx)^2)$$

And the amount of scaling in the Y axis is equal to:

$$\sigma_y = \text{Sqrt}(du/dy)^2 + (dv/dy)^2)$$

Where dx and dy are the amount of change in the Distortion Corrected Image and du and dv are the amount of change in the Linear Projected Image. When the value of σ for a given direction is less than one, the source image is inflated (magnified). When it is greater than one, the source image is deflated (minified). In one embodiment, du and dv are computed using forward differences between the pixel under consideration and adjacent pixels.

To accomplish Step 302, optimizer 210 iterates over all the pixel centers of the distortion corrected image raster grid and tracks the minimum and maximum values of $\sigma_x$ and $\sigma_y$. In one embodiment, it also tracks the minimum and maximum value of $\sigma_x$ divided by $\sigma_y$. The greater of the maximum ratio and the inverse of the minimum ratio is the maximum anisotropy of the warp. This value may be clamped to a maximum value supported by a given implementation or performance budget.

In one embodiment, $\sigma_{xmax}$ and $\sigma_{ymax}$ are recomputed by iterating over the raster grid of $\sigma_x$ and $\sigma_y$ values a second time, normalizing out anisotropy which may skew the number of MIP levels needed to achieve proper filtering. For each pixel, if both $\sigma_x$ and $\sigma_y$ are greater than one, the greater of the two components is divided by the lesser times the (possibly clamped) maximum anisotropy.

Next, optimizer 210 computes 303 the linear projected image resolution from the maximum inflation (minimum scaling factor) along each axis computed in step 302. It does so using the following equations:

$$Vx = Px/\sigma_{xmin}$$

$$Vy = Py/\sigma_{ymin}$$

where Vx and Vy are the X and Y components of viewport dimensions 211, Px and Py are the X and Y components projector 204's native resolution, and $\sigma_{xmin}$ and $\sigma_{ymin}$ are the maximum inflation values computed in Step 302. In one embodiment, Vx and Vy are prevented from exceeding implementation-specific maximum sizes by clamping.

Next, Optimizer 210 Computes 304 the maximum filter footprint size by first evaluating the following equations:

$$Fx = (Vx * \sigma_{xmax})/Px$$

$$Fy = (Vy * \sigma_{ymax})/Py$$

where Fx and Fy are the dimensions of the filter footprint in the X and Y components, respectively.

The computed footprint dimensions are used to configure 305 the filter according to the type of filter to be used. For example, if separable convolution is to be used, then Fx will determine the number of taps in the X-axis and Fy will determine the number of taps in the Y-axis. In one embodiment, MIP-Mapping is used.

MIP-Maps are typically filtered using a trilinear filter for highest quality. The only parameters controlling the trilinear filter are the number of MIP levels and an LOD bias parameter. In one embodiment of the present invention, the number of MIP levels (maximum LOD) is computed using the following equation:

$$\text{Max}Lod = \text{ceil}(\log 2(\max(Fx, Fy))).$$

By precisely determining the number of LODs required, computational overhead is reduced, because a warper utilizing MIP-mapping must generate MIP LODs from linear projected image 201 for each frame to be warped.

In one embodiment, anisotropic MIP-Map filtering is used. Anisotropic filtering typically uses footprint assembly (the blending of multiple trilinearly filtered samples) along the major axis of anisotropy. Anisotropic filtering is controlled by specifying the maximum degree of anisotropy calculated in step 302.

Some MIP-Map filtering systems do not support automatic calculation of MIP LOD of dependent texture fetches. This means that, if the warp is implemented using a texture map as a look-up table whose contents are used to calculate texture coordinates for sampling linear projected image 201, it is necessary in such systems to explicitly specify derivatives to the texture sampler in order to facilitate calculation of MIP LOD, which enables trilinear filtering. In one embodiment, the raster grid of $\sigma_x$ and $\sigma_y$ values computed in step 302 are also included in the filter configuration.

Finally, viewport dimensions 211 (Vx and Vy) are transmitted 306 to 3D renderer 200 and trans-raster distortion corrector 202 and filter configuration 212 is transmitted to corrector 202. If the viewport is smaller than linear projected image 201 (due to granularity), then the actual size of Image 201 is also computed according to the system-specific granularity rules and also transmitted along with Vx and Vy. Dimensions 211 and configuration 212 may be transmitted via shared memory, over a network, or other means of configuration known to those skilled in the art.

The system described improves the quality of images projected onto non-planar surfaces, while simultaneously minimizing the computational complexity required to achieve the improvements in quality. All computation pursuant to optimizing parameters is performed at alignment time, and does not, therefore, impact real-time rendering performance.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for displaying a 3D scene onto a surface using a display device, the method comprising:
   generating a distortion map characterizing a mapping of a projected pixel grid to the surface;
   analyzing the distortion map to determine a maximum inflation and deflation;
   responsive to the maximum inflation and a native resolution of the display device, determining a minimum resolution for sampling the 3D scene;
   rendering the 3D scene into a first buffer with a quantity of elements equal to or exceeding the determined minimum;
   resampling the contents of the first buffer into a second buffer using the distortion map;
   generating a MIP-map from the first buffer, the MIP-map having a plurality of levels, the number of levels determined according to the dimensions of the first buffer and the maximum deflation;
   resampling the contents of the MIP-map into the second buffer using the distortion map; and
   displaying the second buffer onto the surface.

2. The method of claim 1 wherein the optimal resolution is specified in pixel dimensions.

3. The method of claim 1 wherein the optimal resolution is a resolution that does not cause undersampling of the output image.

4. The method of claim 1 wherein the filter is configured to minimize aliasing.

5. A computer program product for displaying a 3D scene onto a surface using a display device, the computer program product stored on a non-transitory computer readable medium and including instructions configured to cause a processor to carry out the steps of:
   generating a distortion map characterizing a mapping of a projected pixel grid to the surface;
   analyzing the distortion map to determine a maximum inflation and deflation;
   responsive to the maximum inflation and a native resolution of the display device, determining a minimum resolution for sampling the 3D scene;
   rendering the 3D scene into a first buffer with a quantity of elements equal to or exceeding the determined minimum;
   resampling the contents of the first buffer into a second buffer using the distortion map;

generating a MIP-map from the first buffer, the MIP-map having a plurality of levels, the number of levels determined according to the dimensions of the first buffer and the maximum deflation;

resampling the contents of the MIP-map into the second buffer using the distortion map; and displaying the second buffer onto the surface.

6. The computer program product of claim 5 wherein the optimal resolution is specified in pixel dimensions.

7. The computer program product of claim 5 wherein the optimal resolution is a resolution that does not cause undersampling of the output image.

8. The computer program product of claim 5 wherein the filter is configured to minimize aliasing.

\* \* \* \* \*